(12) United States Patent
Maeda et al.

(10) Patent No.: US 10,042,145 B2
(45) Date of Patent: Aug. 7, 2018

(54) ILLUMINATION OPTICAL SYSTEM FOR LASER LINE GENERATOR

(71) Applicant: PALO ALTO RESEARCH CENTER INCORPORATED, Palo Alto, CA (US)

(72) Inventors: Patrick Y. Maeda, San Jose, CA (US); Timothy D. Stowe, Alameda, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 3 days.

(21) Appl. No.: 15/400,848

(22) Filed: Jan. 6, 2017

(65) Prior Publication Data

US 2018/0196242 A1    Jul. 12, 2018

(51) Int. Cl.
| | |
|---|---|
| *G02B 26/08* | (2006.01) |
| *G02B 17/00* | (2006.01) |
| *G02B 27/30* | (2006.01) |
| *G02B 27/14* | (2006.01) |
| *G02B 27/10* | (2006.01) |
| *F21V 8/00* | (2006.01) |
| *G03G 15/04* | (2006.01) |

(52) U.S. Cl.
CPC ........... *G02B 17/00* (2013.01); *G02B 6/0001* (2013.01); *G02B 26/0833* (2013.01); *G02B 27/108* (2013.01); *G02B 27/14* (2013.01); *G02B 27/30* (2013.01); *G03G 15/04036* (2013.01)

(58) Field of Classification Search
CPC .. G02B 27/30; G02B 26/0833; G02B 6/0001; G02B 27/108; G02B 27/04; G02B 17/00; G03B 21/008; H04N 5/7458; H04N 9/315; G03G 15/04036
USPC ....................................... 359/223.1
See application file for complete search history.

(56) References Cited

U.S. PATENT DOCUMENTS

| | | |
|---|---|---|
| 5,796,526 A | 8/1998 | Anderson |
| 5,844,588 A | 12/1998 | Anderson |
| 6,359,676 B1 | 3/2002 | Treiber et al. |
| 2015/0153633 A1* | 6/2015 | Nakamura ........... G03B 21/008 348/333.1 |

\* cited by examiner

*Primary Examiner* — Euncha Cherry
(74) *Attorney, Agent, or Firm* — Caesar Rivise, PC (57) ABSTRACT

High resolution printing systems that utilize high power laser diode bars and digital mirror devices (DMD) require side-by-side stacking of illumination modules to stitching of the image from each module to form a longer total image width. An inline illumination optical system having a refractive prism and Total Internal Reflection (TIR) prism pair with an air gap along with a light guide transporting light beams at a compound angle to the prism pair eliminates the need for any axial rotation of the laser and light guide, and enables side-by-side module stacking. The illumination optical system includes an illumination module having a light source, the light guide, a DMD array and a Refractive TIR (RTIR) prism. The system also includes a DMD housing containing the DMD array and having a width within which the illumination module is confined to allow side-by-side stacking.

20 Claims, 10 Drawing Sheets

ILLUMINATION OPTICAL SYSTEM FOR LASER LINE GENERATOR

FIELD OF DISCLOSURE

This invention relates generally to high resolution printing systems, and more particularly, to high resolution printing systems having illumination optical systems including laser sources and digital mirror devices (DMDs).

BACKGROUND

A digital offset or digital architecture printing system may be used for printing with lithographic inks. Digital offset printing processes may include applying fountain solution to a surface of an imaging plate. The imaging plate may be arranged on an outer portion of an imaging cylinder. The imaging cylinder may be rotatable for bringing regions of the imaging plate surface to pass adjacent subsystems, including: a dampener for applying fountain solution; an imaging system for imaging or image-wise vaporization of fountain solution from select regions of the imaging plate; an inker for applying ink to the imaging plate surface; a transfer station from which an ink image is transferred to a printable medium; and a cleaner for removing residue from a surface of the image plate and preparing the surface to begin the process anew. After applying the fountain solution, an imaging system composed of a high power laser may be used to image-wise vaporize fountain solution from select regions of the surface. Light energy is absorbed by the imaging plate, which may comprise silicone, to locally heat and boil off fountain solution from the plate surface. The laser may be used for vaporizing the fountain solution at select surface regions in accordance with digital image data. Ink may be applied by the inker, and may be deposited on regions where fountain solution has been vaporized from the imaging plate. Conversely, ink may be rejected by regions of the imaging plate surface where fountain solution remains. A resulting image is transferred at the transfer station to paper or other suitable media by way of pressure.

For the imaging step, an imaging system may be used that is configured to produce an output beam that spans the operative width of an imaging plate surface. Due to the high output power requirement, it is difficult to construct a suitable imaging system from a monolithic imager. It is much more feasible and economical to construct the imaging system from an array of imagers, each possessing a light beam width that is smaller than the imaging plate operative width. To construct the imaging system, multiple imagers or illumination modules may be configured to "stitch" together a light beam having a useful process width for a longer total image.

Current imaging systems use illumination modules having light guides with mirrors or prism designs to homogenize and deliver light beams onto spatial light modulators, such as digital mirror devices (DMD). These current illumination modules require lateral space and axial rotation of the illumination system. This prevents side-by-side stacking of the illumination modules, which is necessary in high resolution printing systems having illumination systems with light sources and DMDs that require side-by-side stacking of the illumination modules for stitching of high resolution images from each module to form a longer total image width.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a refractive prism and TIR prism pair with an air gap along with the angle of the light guide to produce an inline illumination optical system that eliminates the need for any axial rotation of the laser and light guide, eliminates the need for lateral space, and enables side-by-side module stacking.

According to aspects illustrated herein, an illumination optical system includes an illumination module and a Digital Mirror Device (DMD) housing, with the illumination module having a light source, a light guide, a DMD array and a Refractive Total Internal Reflection (RTIR) prism. The light source is configured to generate a light beam. The light guide is adjacent the light source to transport the light beam from the light source to the DMD array, which is a planar array of micromirrors in 2D configuration tilted around a diagonal axis. The DMD array has a row direction and a column direction orthogonal to the row direction, with both the row direction and the column direction being within the plane of the DMD array. The light beam is transported by the light guide out of an exit face thereof at a compound angle relative to the row and column directions. The RTIR prism receives the light beam from the light guide and redirects the light beam to the DMD array along a compound incident angle. The RTIR prism includes a 45-45-90 degree prism and a compound angle prism. The compound angle prism has a 45 degree bottom face above a top face of the 45-45-90 degree prism with an airspace gap therebetween. The 45-45-90 degree prism has an bottom face mounted parallel to the plane of the DMD array. The DMD array modulates the light beam and generates an image as reflected image output beams. The 45-45-90 degree prism directs the image output beams to a projection optical system that images the DMD onto the imaging member. The DMD housing contains the DMD array such that the illumination module is confined within the width of the DMD housing.

The illumination optical system may include a plurality of illumination modules as summarized above stacked against each other in a side-by-side configuration with parallel DMD row directions for stitching of the image output beams of each illumination module into an image line parallel to the row direction of the DMD arrays. A collimator lens may be located between the laser diode bars and the light guide. The light source may be a plurality of laser diode bars. According to examples, the light guide is tilted at an angle towards the compound angle prism based on the refractive index of the RTIR prism and the central ray direction of the redirected light beam incident on the DMD. Relay lenses between the light guide and the RTIR prism image the exit face of the light guide onto the DMD array via the RTIR prism.

A method of exposing an imaging member includes generating a light beam from a light source of a first illumination module, transporting the light beam from the light source to a RTIR prism with a light guide at an angle relative to a DMD array, redirecting the light beam to the DMD array along a compound incident angle with the RTIR prism, the RTIR prism including a 45-45-90 degree prism and a compound angle prism, modulating the light beam with the DMD array to generate an image as reflected image output beams, redirecting the reflected image output beams to the imaging member through the 45-45-90 degree prism and projection optical system, and stitching the image output beams to image output beams from a second illumination module stacked against the first illumination module in a side-by-side configuration with parallel DMD row directions, the stitched image out beams forming an image line parallel to the row direction of the DMD arrays.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

The disclosed printer system may be operated by and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may, of course, vary depending on the particular functions, software type, and microprocessor or other computer system utilized, but will be available to, or readily programmable without undue experimentation from, functional descriptions, such as, those provided herein, and/or prior knowledge of functions which are conventional, together with general knowledge in the software of computer arts. Alternatively, any disclosed control system or method may be implemented partially or fully in hardware, using standard logic circuits or single chip VLSI designs.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. It will be appreciated by respective engineers and others that many of the particular components mountings, component actuations, or component drive systems illustrated herein are merely exemplary, and that the same novel motions and functions can be provided by many other known or readily available alternatives. All cited references, and their references, are incorporated by reference herein in their entireties where appropriate for teachings of additional or alternative details, features, and/or technical background. What is well known to those skilled in the art need not be described herein.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

When referring to any numerical range of values herein, such ranges, are understood to include each and every number and/or fraction between the stated range minimum and maximum. The same applies to each other numerical property and/or elemental range set forth herein, unless the context clearly dictates otherwise.

The term "printing device", "imaging machine" or "printing system" as used herein refers to a digital copier or printer, scanner, image printing machine, xerographic device, electrostatographic device, digital production press, document processing system, image reproduction machine, thermal printing system, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

High resolution (e.g., 300 dpi to 2400 dpi) printing systems that utilize high power (e.g., 40 W to 200 W) laser diode bars and digital mirror devices (DMD) require side-by-side stacking of illumination modules (e.g., imagers) to stitching of the image from each module to form a longer total image width. Current illumination methods utilize light guides or other light beam homogenization mechanisms (e.g., wave guides, mirrors, lenses, microlens arrays, relay optics, and combinations thereof) to homogenize and deliver light onto the DMD spatial light modulator. These designs require lateral space and axial rotation of the illumination system that prevents side-by-side stacking.

The term "light guide" as used herein refers to structure having the ability to trap a light emission in a certain region and guide and transmit its energy flow. The light guide may refer to any beam homogenization mechanism configured for directed transmission of the light emission. The light guide may be a solid integral optical element comprising a optically transparent dielectric material (e.g., glass or plastic) that is configured and positioned such that the coherent light undergoes total internal reflection whenever it impinges on the light guide walls as it propagates through the optical material, whereby the coherent light entering the light guide is mixed (converted) and exits the light guide as substantially homogenous light.

Figure 1:
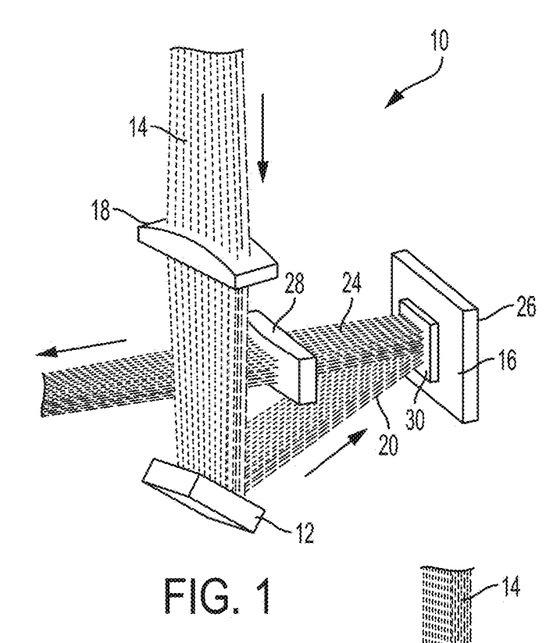
FIG. 1 is an elevational view showing relevant elements of an exemplary illumination optical system.
Figure 2:
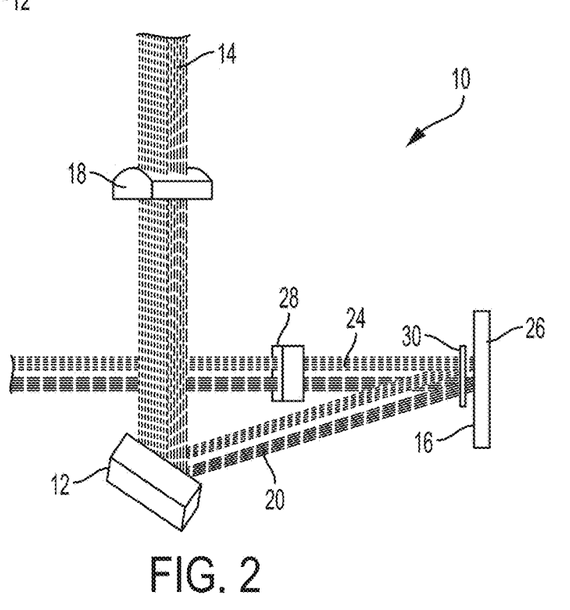
FIG. 2 is an side view of the illumination optical system of FIG. 1.
Figure 3:
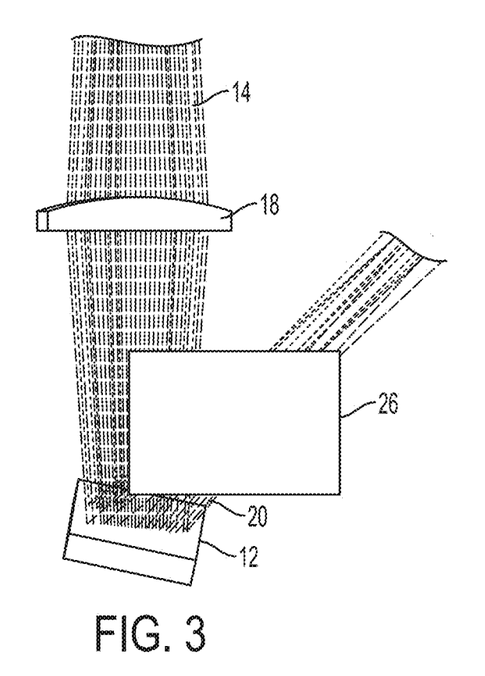
FIG. 3 is a front view of the illumination optical system of FIG. 1.

FIGS. 1-3 depicts such a design of an illumination module 10 from different views with a fold mirror 12 that redirects an incoming beam 14 from a laser source (not shown) incident on a spatial light modulator (e.g., DMD array 16). A relay lens 18 may focus the incoming beam 14 onto the DMD array 16 via the fold mirror 12, with the fold mirror reflecting the incoming beam as a redirected incoming light beam 20. The redirected incoming light beam 20 arrives at a compound angle to the normal direction of the DMD array plane. As can be seen, for example, in FIG. 4, the light beam 20 is directed along a compound angle relative to a vector perpendicular to the tangent plane of the surface of the DMD array 16.

Figure 4:
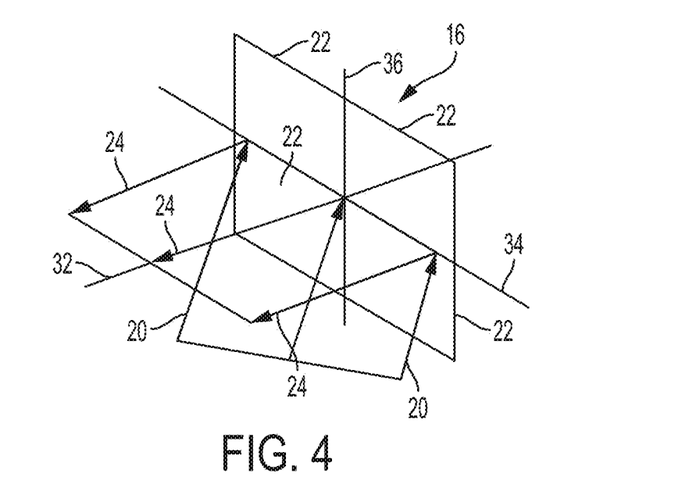
FIG. 4 is a schematic view of compound angle illumination on DMD micromirrors.

FIG. 4 depicts the DMD array 16 including a 2D array of micromirrors 22 having tilt angles around a diagonal axis to modulate the light beam 20 and generate an image as image output beams 24 reflected, for example, at the normal 32 to the DMD array plane. For example, the micromirrors 22 may have tilt angles plus or minus 12 degrees around a 45 degree diagonal axis. It is understood that the micromirrors may be manufactured with other tilt axis from zero to 90 degrees, and the invention is not limited to any particular tilt axis.

Referring back to FIGS. 1-3, the fold mirror 12 reflects the incoming light beam 14 at the compound angle to the DMD array 16, which is housed in a DMD housing 26. The DMD array 16 reflects outgoing image beams 24, which are focused by a post-DMD projection optical system that may include lens 28 onto an imaging member (not shown). A DMD window 30 may be mounted parallel to the DMD array plane to protect the DMD array 16 while allowing the light beams to pass through the window.

To generate the compound angle illumination, the fold mirror 12 is used to direct the light from the laser source and homogenization optics (e.g., relay lens 18) to the DMD array 16. The compound angles add complexity to an illumination optical system and optomechanical layout of the illumination module 10 that would not exist if the tilt axis of the micromirrors 22 in the DMD array was oriented in either the row or column directions. One of the consequences is that optical components (e.g., fold mirror, post-DMD lens) of the illumination optical system must extend into the space alongside the DMD array 16. Another constraint is that parts of the illumination optical system would have to be rotated around an optical axis so that the projected illumination pattern on the DMD array 16 would be parallel to the row direction 34 of the array. The optical axis is a line passing through the center of an optical element parallel to the axis of symmetry which is also perpendicular to the plane of the optical element. Still referring to FIGS. 1-3, the optical axis is a line perpendicular to the plane of the DMD array 16 that is centered on the DMD. These requirements may nearly be accommodated in a DMD based computer projector. However, for high resolution printing systems, the total line image width is produced by stitching shorter line images from individual illumination modules, which need to be stacked side-by-side for the stitching.

Figure 5:
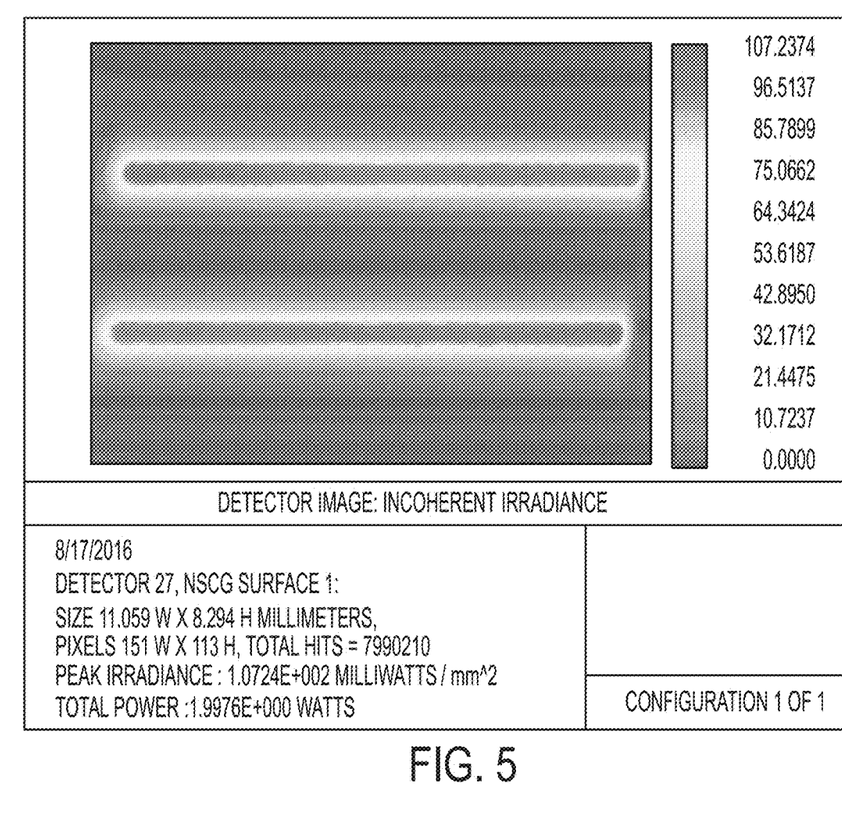
FIG. 5 depicts an exemplary image irradiance pattern from the illumination module relay lens and fold, mirror, DMD, and first lens of the projection optical system of FIG. 1.

The design limitations of the illumination module 10 preclude the side-by-side stacking of illumination modules and the formation of the desired stitched line image, where the line image is parallel to the row direction 34 of the DMD array. As can best be seen in FIG. 3, to avoid optomechanical interference between the laser sourced incoming beam and optics (e.g., post-DMD lens 22) for the outgoing image beam headed to the imaging plate after reflection off the DMD array 16 and transmitted through the projection optical system, the fold mirror 12 must be placed in a position that extends beyond the side of the DMD housing 18. Accordingly, illumination systems such as the illumination module 10, where the DMD housing 18 defines the lateral extent of the illumination module, cannot be stacked side by side free of any mechanical interference. FIG. 5 shows the irradiance pattern of the light on the DMD array 16 depicted in FIGS. 1-3. It can be seen that the irradiance pattern has a less desirable parallelogram shape.

For high resolution printing systems, the inventors have eliminated these issue by implementing an inline illumination optical system having a refractive prism and TIR prism pair with an air gap along with the angle of the light guide that: eliminates the need for any axial rotation of the laser and light guide, eliminates the need for lateral space, and enables side-by-side module stacking. Elimination of the axial rotation of the laser and light guide also makes the illumination pattern projected on the DMD more rectangular and less like a parallelogram. This is important for illumination modules that use more than one laser diode bar, where each laser diode bar may include multiple laser diodes.

FIGS. 6-12 depict an illumination optical system configured to illuminate a DMD array. The illumination optical system includes an illumination module 100 having a light source 102, a light guide 104, a digital mirror device (DMD) array 106 and a Refractive Total Internal Reflection (RTIR) prism 108. The illumination optical system also includes a DMD housing 110 containing the DMD array 106. In the exemplary embodiments, the DMD housing 110 has a width within which the illumination module 100 is confined to allow side-by-side stacking.

Figure 8:
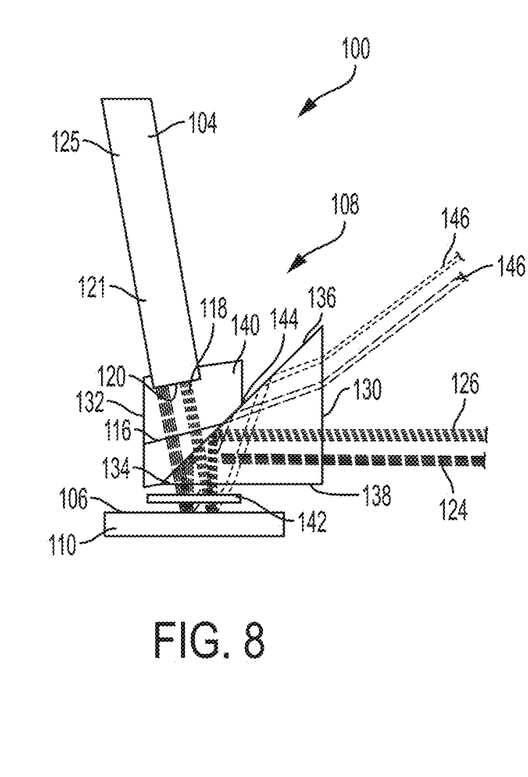
FIG. 8 is an enlarged side view of the illumination module of FIG. 6.
Figures 9, 10:
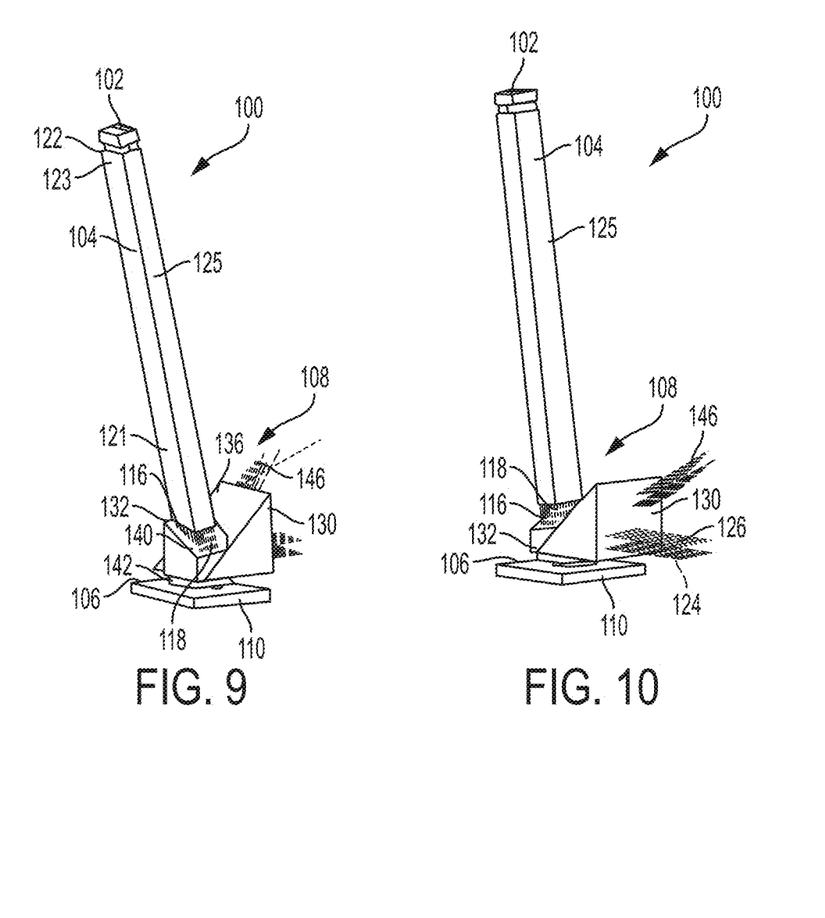
FIG. 9 is a first angled view of the illumination module of FIG. 6.
FIG. 10 is a second angled view of the illumination module of FIG. 6.
Figure 11:
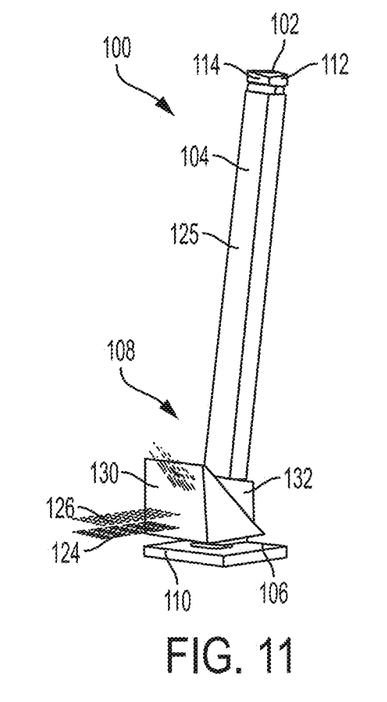
FIG. 11 is a third angled view of the illumination module of FIG. 6.
Figure 12:
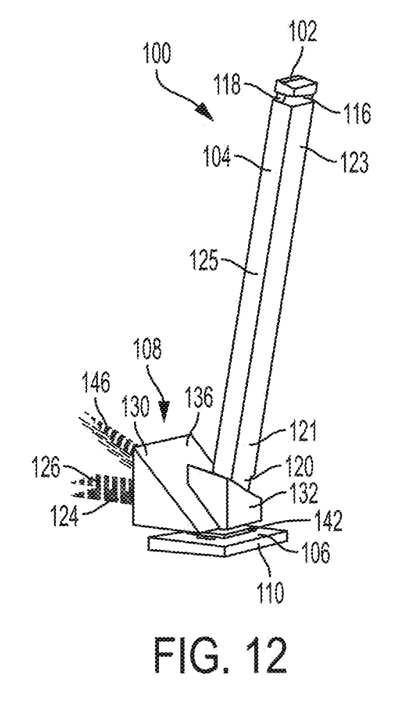
FIG. 12 is a fourth angled view of the illumination module of FIG. 6.

While not being limited to a particular theory, the light source 102 is a laser emitter configured to generate at least one light beam. For example, the light source may be one or more laser diode bars 112, 114, with each laser diode bar emitting a respective light beam 116, 118 (FIG. 8). Optical components, such as a collimator lens 128 (FIG. 6) is shown between the light source 102 and the light guide 104. The collimator lens may be a fast axis collimator (FAC) lens, such as a 2 mm focal length FAC lens.

The light guide 104 is adjacent the collimator lens 128 opposite the light source 102 with an entry face 122 at a first side 123 thereof facing the collimator lens to receive the light beams 116, 118 from the light source, and an exit face 120 at a second side 121 of the light guide opposite the first side from which the light beams exit the light guide. While not being limited to a particular theory, the light guide 104 is elongated, for example, in a rectangular cross-section pipe shape having an elongated shaft 125 extending between the entry and exit faces in a longitudinal direction, and is configured to transmit the light beams from the light source through the light guide in the longitudinal direction with minimal or no loss, for example, by total internal reflection. These light beams are transported out of the exit face 120 at a compound angle relative to row and column directions of the DMD array 106, as will be discussed in greater detail below. The light guides 104 may be made of optical grade materials such as acrylic resin, polycarbonate, epoxies, and glass. While the entry face 122 and exit face 120 are shown normal to the longitudinal direction of the elongated light guide 104, it is understood that and that the scope is not limited to any particular angle or dimension. It is understood that the lightguide is not limited to this configuration. For example, a hollow lightguide can also be made using flat mirrors that form reflective walls.

The DMD includes an array 106 of micromirrors 22 in 2D configuration tilted around a diagonal axis. The DMD array of micromirrors is planar with a row direction 34 and a column direction 36 orthogonal to the row direction. Thus, both the row direction 34 and the column direction 36 are along the plane of the DMD array 106. The DMD array 106 is configured to modulate the light beams 116, 118 and generate an image as reflected image output beams 124, 126. In the examples, the DMD array micromirrors 22 are square faced and tilted plus or minus 12 degrees around a 45 degree tilted diagonal axis. That is, the micromirrors tilt or pivot along a diagonal axis across opposite corners of the micromirror. Of course, the scope of the invention is not limited to any particular tilt or axis, and may be applicable to any axis between zero and 90 degrees.

The RTIR prism 108 is configured to receive the light beams 116, 118 from the light guide 104 and redirects the light beams to the DMD array 106 along a compound incident angle, as described in greater detail below. The RTIR prism 108 includes two optical members separated by a small gap. The optical members shown in FIGS. 6-12 are a 45-45-90 degree prism 130 and a compound angle prism 132, with both prisms preferably having the same reflective index. The compound angle prism has a top face 140 tilted at a compound angle that will direct the light beams 116, 118 onto the DMD array 106. Of course the compound angle prism may be a simple wedge that is rotated to achieve the desired compound tilt angle of the top surface.

As can be seen in FIG. 8, the compound angle prism 132 is shown having a 45 degree bottom face 134 above a top face 136 of the 45-45-90 degree prism 130 with the airspace gap 144 (e.g., 5 µm-50 µm) therebetween. It is understood that the bottom face 134 and top face 136 should be maintained parallel to each other, with the gap 144 there between. Spacers (not shown) may be provided to help maintain parallelism between the prisms 130, 132. The 45-45-90 degree prism 130 has a bottom face 138 that may be mounted parallel to the plane of the DMD array 106. The 45-45-90 degree prism 130 is configured to direct the image output beams 124, 126 to a projection optical system (not shown) that images the DMD array 106 onto an imaging member of a high resolution printing system. In other words, the 45-45-90 degree prism 130 is configured to direct the image output beams 124, 126 to the imaging member via the projection optical system.

Still referring to FIG. 8, the 45-45-90 degree prism 130 passes the light beams 116, 118 from the compound angle prism 132 to the DMD array 106, and reflects the image output beams 124, 126 to the projection optical system that images the DMD array 106 onto the imaging member where they may be stitched with image output beams from adjacent imaging modules to form a longer total image width on the imaging member. The 45-45-90 degree prism 130 also reflects incident light 146 of off state beams from the DMD array 106 that are different than the image output beams 124, 126. To help ensure that these off state beams are directed harmlessly out of the imaging module 100, the 45-45-90 degree prism may have a width greater than the width of the compound angle prism to direct the incident light of off state beams away from the light beams 116, 118 and image output beams.

A relay lens may be positioned between the light guide exit face 120 and a top face 140 of the compound angle prism 132 to image the exit face of the light guide onto the DMD array 106 via the RTIR prism 108. A DMD window 142 may be mounted parallel to and between the bottom face 138 of the 45-45-90 degree prism 130 and the DMD array 106. While not being limited to a particular theory, the DMD window 142 may protect the DMD array 106 from contamination like dust particles or other foreign material, and from inadvertent physical contact. The micromirrors 22 on the DMD are typically very small, for example about 10.8 microns in diameter, and cannot be cleaned without being damaged or contaminated even further. The DMD window may also be hermetically sealed to keep out moisture and can hold in certain types of gasses that aid in the micromirror operation.

The light guide 104 is tilted at an angle towards the compound angle prism 132 based on the refractive index of the RTIR prism 108 and the central ray direction of the RTIR prism redirected light beam incident on the DMD. As mentioned above, the RTIR prism 108 receives the light beams 116, 118 from the light guide 104 and redirects the light onto the DMD array 106 along a required compound incident angle. Both of the 45-45-90 degree prism 130 and a compound angle prism 132 are made of the same glass type and therefore have the same refractive index, n. The laser, FAC (Fast-Axis Collimator) lens, and light guide are shown tilted at an angle θ from the DMD plane normal 32 (p) to produce a projected illumination pattern on the DMD array 106 that is parallel to the row direction 34 of the DMD array. While not being limited to a particular theory, the tilt angle θ may be determined by the refractive index of the RTIR prism 108 and the central ray direction unit vector, k, of the RTIR prism redirected light beams 116, 118 incident on the DMD array.

$$\theta = -\tan^{-1}\left(\frac{v_x}{v_y}\right) \tag{1}$$

-continued $$v = \frac{-1}{n}k - \left[\frac{1}{n}\frac{k \cdot p}{\|k\|\|p\|} + \sqrt{1 - \left(\frac{1}{n}\right)^2\left(1 - \left[\frac{k \cdot p}{\|k\|\|p\|}\right]^2\right)}\right] \cdot p \quad (2)$$

$$k = \begin{bmatrix} 0.287606 \\ -0.913545 \\ 0.287606 \end{bmatrix} \quad (3)$$

$$p = \begin{bmatrix} 0 \\ 1 \\ 0 \end{bmatrix} \quad (4)$$

Where the x-direction is parallel to the DMD row direction 34, the y-direction is normal 32 to the DMD plane, and the z-direction is parallel to the DMD column direction 36.

Referring to FIGS. 6-12, the collimator lens 128 is a 2 mm focal length FAC lens, the light guide 104 is a 100 mm long BK7 straight rectangular cross-section light pipe, with a refractive index, n of about 1.507 at 1020 nm, and the RTIR prism 108 is a SF5 RTIR prism with a refractive index, n of about 1.65 at 1020 nm. The laser diode bars 112, 114, collimator lens 128 and light guide 104 are tilted at a tilt angle of 10.185 degrees from vertical. The 45-45-90 degree prism 130 has dimensions of about 20 mm×20 mm 25 mm and a compound angle prism 132 has dimensions of about 16 mm×16 mm×8 mm. The 45-45-90 degree prism 130 and a compound angle prism 132 are separated by a 10 µm air gap 144, and the top face 140 of the compound angle prism is tilted by tilt angle θx=79.815 degrees, tilt angle θy=24.658 degrees, tilt angle θx=20.719 degrees. The light guide 104 has an internal aperture cross section of 10 mm×6 mm. With reference to these dimensions, the exit face 120 of the light guide 104 may be 15 mm or more above the DMD array 106 to avoid mechanical interference with the RTIR prism 108. The 15 mm allows for a 1.11 mm DMD array 106 to DMD window gap, and a 1.0 mm gap between the DMD window and the bottom face 138 of the 45-45-90 degree prism 130. The DMD window 142 may be about 1.0-1.1 mm thick. It is understood that the dimensions of the elements are by example only, and do not limit the scope to any particular dimension.

Figure 6:
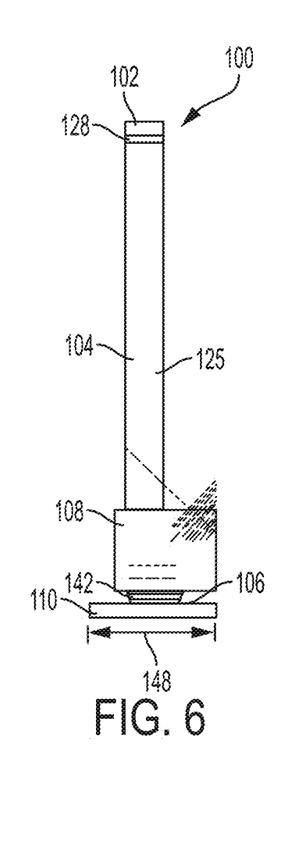
FIG. 6 is a front view showing relevant elements of an exemplary illumination optical system illumination module of the invention.
Figure 7:
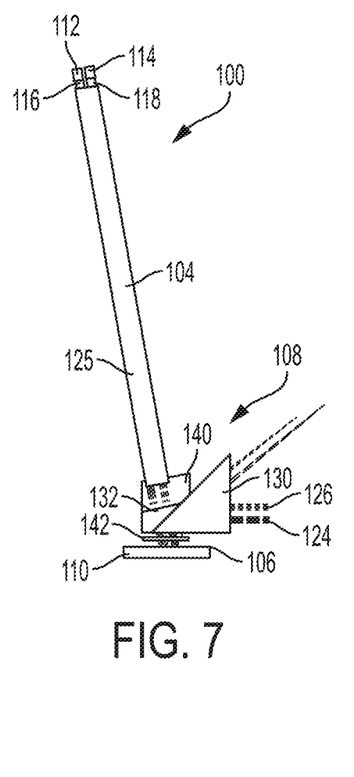
FIG. 7 is an side view of the illumination module of FIG. 6.

As noted above, the DMD array 106 is contained in the DMD housing 110, which is large enough to include a mount (e.g., ceramic) and electronics associated with the DMD. While not being limited to a particular size, the DMD housing 110 has a width 148 greater than the width of the DMD array 106 (e.g., sum of the micromirrors 22 in the row direction 34 of the DMD array). The width 148 may be between 1.1 and 10 times greater than the width of the DMD array, and more particularly, between 2 and 5 times greater than the width of the DMD array. For example, the DMD housing may have dimensions of about 32.2 mm wide×22.3 mm×3.0 mm while the DMD array may be about 11.06 mm wide and the 45-45-90 degree prism about 25 mm wide. This means that the illumination module 100 does not extend beyond the sides of the DMD housing 110. As can be seen in FIG. 6, the width of the illumination module 100 is limited by the width of the DMD housing 110, such that the DMD housing represents the lateral extent of the illumination module. This inline configuration allows illumination modules 100 to be stacked side by side in the illumination optical system. Accordingly the illumination optical system may include a plurality of illumination modules 100 stacked against each other in a side-by-side configuration with abutting DMD housings 110 intentionally designed for stitching of the image output beams from each illumination module into an image line parallel to the row direction 34 of the DMD array 106.

Figure 13:
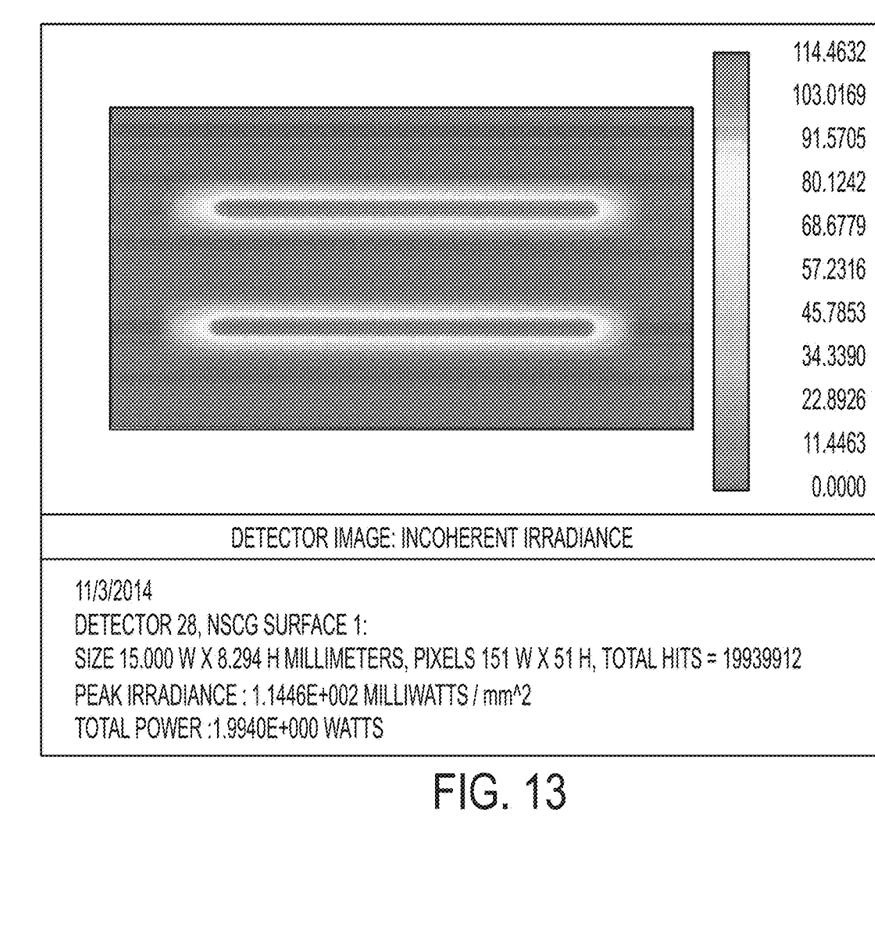
FIG. 13 depicts an exemplary image irradiance pattern from the illumination module of FIG. 6.

FIG. 13 shows an exemplary image irradiance pattern from the light source 102 onto the DMD array 106. As can be seen, the irradiance pattern of the light on the DMD array is rectangular as desired, and less like the parallelogram pattern shown in FIG. 5.

It is understood that the light guides discussed herein are exemplary light homogination mechanisms configured for the directed transmission of luminous energy from a light source. The term "light guides" also refers to other light homogenization mechanisms, including waveguides, microlens array homogenizers, mirrors, prisms and other relay optics, or combination thereof, that are intentionally designed to transmit light in a particular direction.

Figures 14, 15:
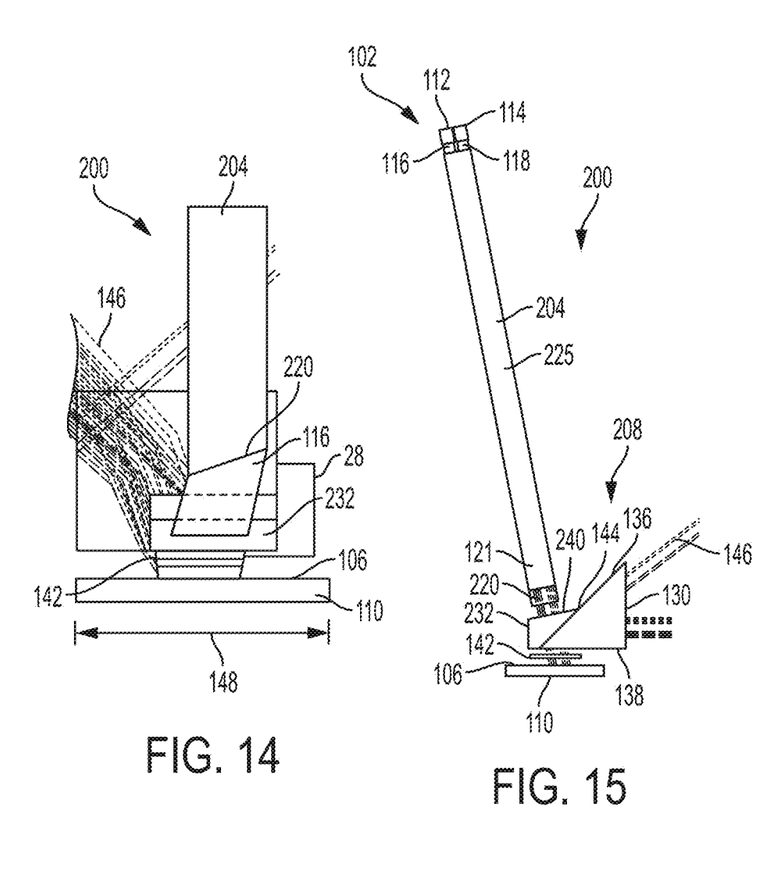
FIG. 14 is a front view showing relevant elements of another exemplary illumination optical system illumination module of the invention.
FIG. 15 is an side view of the illumination module of FIG. 14.
Figure 16:
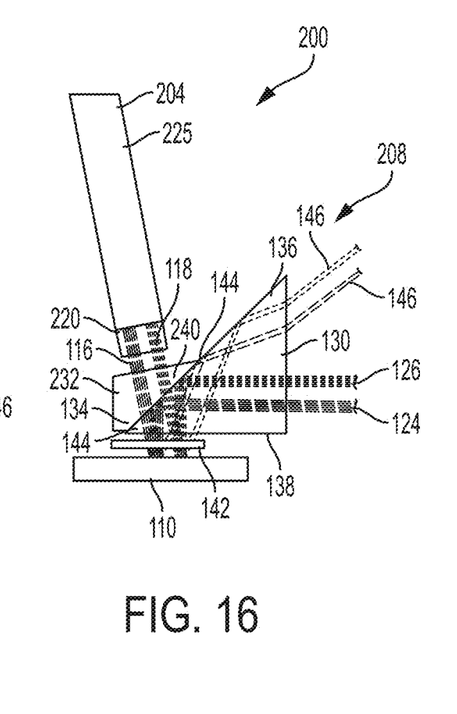
FIG. 16 is an enlarged side view of the illumination module of FIG. 14.
Figure 17:
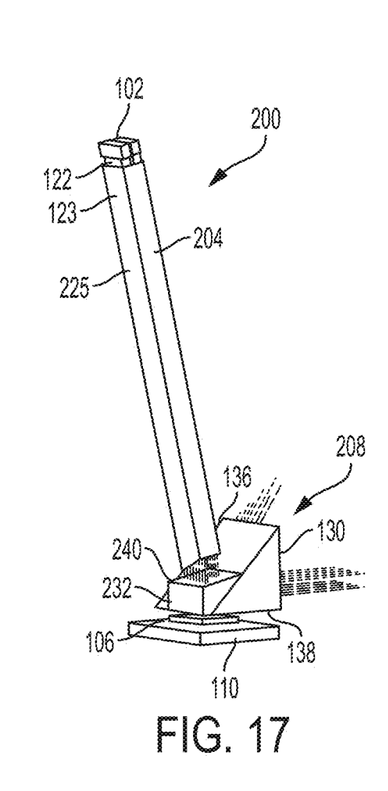
FIG. 17 is a first angled view of the illumination module of FIG. 14.
Figure 18:
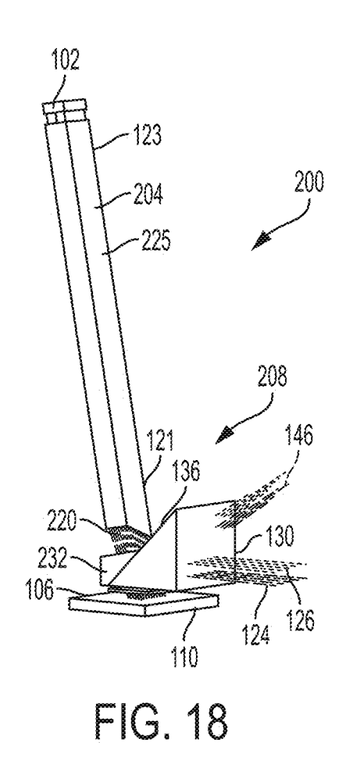
FIG. 18 is a second angled view of the illumination module of FIG. 14.
Figure 19:
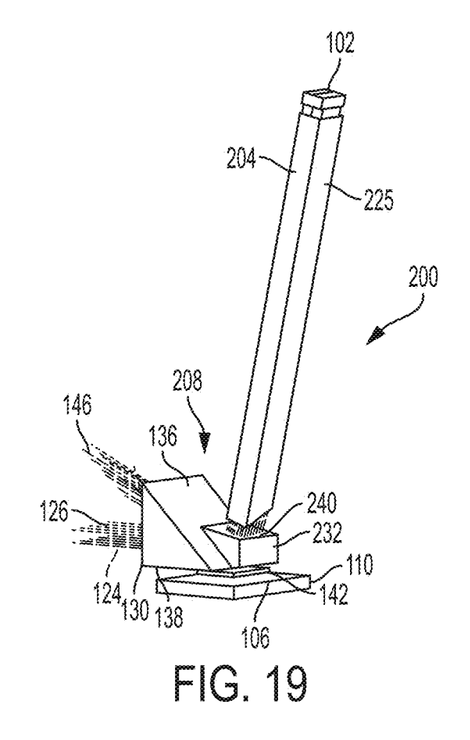
FIG. 19 is a third angled view of the illumination module of FIG. 14.

FIGS. 14-19 depict another example of an illumination optical system configured to expose a DMD. The illumination optical system includes an illumination module 200 similar to the illumination module 100 depicted in FIGS. 6-12. For example, the illumination module 200 includes the light source 102 and DMD array 106 as discussed above. In addition, the illumination module 200 includes a light guide 204 similar to the light guide 104, and a RTIR prism 208 similar to the RTIR prism 108. The illumination optical system referred to in FIGS. 14-19 also includes the DMD housing 110 containing the DMD array 106. As can be seen in FIG. 14, the DMD housing 110 has a width 148 within which the illumination module 200 is confined to allow side-by-side stacking.

The light guide 204 is adjacent the collimator lens 128 opposite the light source 102 with an entry face 122 at a first side 123 thereof facing the collimator lens to receive the light beams 116, 118 from the light source, and an exit face 220 at a second side 122 of the light guide opposite the first side from which the light beams exit the light guide. While not being limited to a particular theory, the light guide 204 is elongated in a generally rectangular cross-section pipe shape having an elongated shaft 225 extending between the entry and exit faces in a longitudinal direction, and is configured to transmit the light beams from the light source through the light guide in the longitudinal direction with minimal or no loss, for example, by total internal reflection. The light guides 204 may be made of optical grade materials such as acrylic resin, polycarbonate, epoxies, and glass.

The RTIR prism 208 is configured to receive the light beams 116, 118 from the light guide 204 and redirects the light beams to the DMD array 106 along a compound incident angle, as described in greater detail below. The RTIR prism 208 includes two optical members. The optical members shown in FIGS. 14-19 are a compound angle prism 232 and the 45-45-90 degree prism 130 separated by a small gap 144, with both prisms preferably having the same reflective index. The compound angle prism 232 may be a wedge prism having a top face 240 that may be tilted at an angle that will direct the light beams 116, 118 onto the DMD array 106.

Similar to the compound angle prism 132 discussed above, the compound angle prism 232 is shown having a 45 degree bottom face 134 above a top face 136 of the 45-45-90 degree prism 130 with the airspace gap (e.g., 10 µm) therebetween. The 45-45-90 degree prism 130 has a bottom face 138 that may be mounted parallel to the plane of the DMD array 106. The 45-45-90 degree prism 130 is configured to direct the image output beams 124, 126 to a projection optical system that images the DMD array 106 onto an imaging member of a high resolution printing system.

As can best be seen in FIGS. 14 and 17-19, the light guide 204 is a wedge light guide with the exit face 220 at the second side 122 angled with respect to the normal of the light guide's elongated shaft 225. In other words, the second side 122 is configured with the exit face 220 angled or slanted with respect to the normal of the axis of the light guide shaft 225. While not being limited to a particular theory, the second side 122 may include a wedge prism with the exit face 220 corresponding to the bottom or outer face of the wedge prism. This angled exit face 220 causes the light beams 116, 118 to exit at a direction angled from the longitudinal direction of the elongated shaft 225. These light beams may be transported out of the angled exit face 220 at a compound angle relative to row and column directions 34, 36 of the DMD array 106. However, due to the change in light direction caused by the wedge surface of the angled exit face 220, the top face 240 of the compound angle prism 232 is not tilted at a compound angle. The desired compound angle relative to the row and column directions of the DMD array 106 may be achieved by the wedge light guide 204 changing the light direction to the RTIR prism 208.

The wedge light guide 204 is tilted at an angle towards the compound angle prism 232 to transport the light beams 116, 118 at the changed light direction to the RTIR prism 208, which redirects the light beams onto the DMD array 106 along a required compound incident angle. Both of the 45-45-90 degree prism 130 and a compound angle prism 232 are made of the same glass type and therefore have the same refractive index, n. The light source 102, collimator lens 128, and light guide 204 are shown tilted at an angle θ from the DMD plane normal p to produce a projected illumination pattern on the DMD array 106 that is parallel to the row direction 34 of the DMD array. While not being limited to a particular theory, the tilt angle θ may be determined by the refractive index of the RTIR prism 108 and the central ray direction unit vector, k, of the RTIR prism redirected light beams 116, 118 incident on the DMD array as discussed above, for example, in equations (1) to (4), where the x-direction is parallel to the DMD row direction 34, the y-direction is normal to the DMD plane 32, and the z-direction is parallel to the DMD column direction 36.

Referring to the example shown in FIGS. 14-19, the collimator lens 128 is a 2 mm focal length FAC lens. The light guide 204 is a 100 mm long straight SF11 light pipe with an internal aperture cross section of 10 mm×6 mm and exit face 220 angled at about 20 degrees (e.g., 19.83 degrees) with respect to the normal of the light guide's elongated shaft 225. The RTIR prism is made of BK7 optical glass with a refractive index n of 1.507 at 1020 nm. The laser diode bars 112, 114, collimator lens 128 and light guide 204 are tilted at a tilt angle of 11.2091 degrees from vertical. The compound angle prism 232 is a 33.7909 degree wedge prism mounted on the 45-45-90 degree prism 130 with a 10 µm air gap there between. The wedge prism is angled 11.2091 degrees from horizontal and the longitudinal direction of the light guide is perpendicular to the plane of the wedge prism top surface. As noted above, a hollow lightguide can also be made using flat mirrors that form reflective walls. In this embodiment such a hollow lightguide would ideally be followed by a prism with an aperture cross section of 10 mm×6 mm and exit face 220 angled at about 20 degrees (e.g., 19.83 degrees) with respect to the normal of the light guide's elongated shaft.

With reference to these dimensions, the exit face 220 of the light guide 204 may be 15 mm or more above the DMD array 106 to avoid mechanical interference with the RTIR prism 208. The 15 mm allows for a 1.11 mm DMD array 106 to DMD window 142 gap, and a 1.0 mm gap between the DMD window and the bottom face 138 of the 45-45-90 degree prism 130. The DMD window 142 may be about 1.0-1.1 mm (e.g., 1.05 mm) thick. The wedge prism 232 is about 16 mm×8.65 mm×12.93 mm. It is understood that the dimensions of the elements are by example only, and do not limit the scope to any particular dimension.

As noted above, the DMD housing 110 has a width greater than the length of the micromirrors 22 in the row direction 34 of the DMD array 106. This means that the illumination module 200 does not extend beyond the sides of the DMD housing 110. As can be seen in FIG. 14, the width of the illumination module 200 is limited by the width of the DMD housing 110, such that the DMD housing represents the lateral extent of the illumination module. This inline configuration allows illumination modules 200 to be stacked side by side in the illumination optical system. Accordingly the illumination optical system may include a plurality of illumination modules 200 stacked against each other in a side-by-side configuration with abutting DMD housings 210 intentionally designed for stitching of the image output beams from each illumination module into an image line parallel to the row direction 34 of the DMD array 106.

Figure 20:
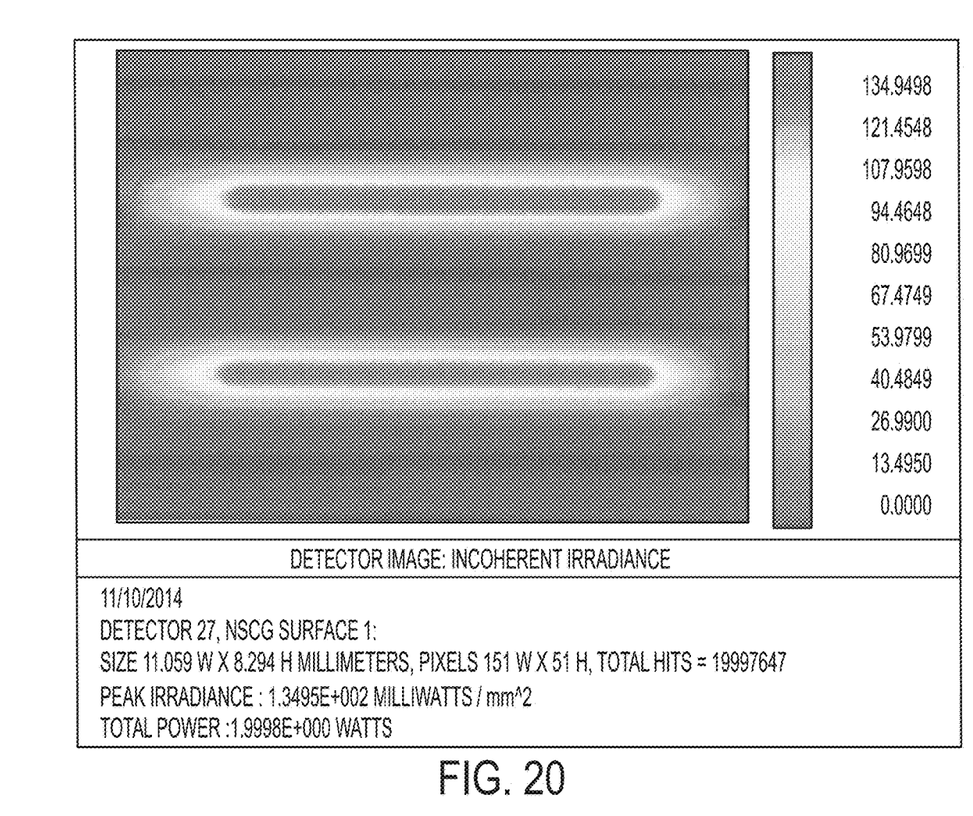
FIG. 20 depicts an exemplary image irradiance pattern from the illumination module of FIG. 14.

FIG. 20 shows an exemplary image irradiance pattern from the light source 102 of the illumination module 200 onto its DMD array 106. As can be seen, the irradiance pattern of the light on the DMD array is rectangular as desired, like the rectangular irradiance pattern shown in FIG. 13, and less like the parallelogram pattern shown in FIG. 5.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An illumination optical system configured to illuminate a Digital Micromirror Device (DMD) array, comprising:
   an illumination module including:
   a light source configured to generate a light beam,
   a light guide adjacent the light source to transport the light beam from the light source,
   the DMD array having an array of micromirrors in 2D configuration tilted around a diagonal axis, the DMD array of micromirrors being planar with a row direction and a column direction orthogonal to the row direction, both the row direction and the column direction being within the plane of the DMD array, the light beam being transported by the light guide and out of an exit face of the light guide at a compound angle relative to the row and column directions, and
   a Refractive Total Internal Reflection (RTIR) prism that receives the light beam from the light guide and redirects the light beam to the DMD array along a compound incident angle, the RTIR prism including a 45-45-90 degree prism and a compound angle prism, the compound angle prism having a 45 degree bottom face above a top face of the 45-45-90 degree prism with an airspace gap therebetween, the 45-45-90 degree prism having an bottom face mounted parallel to the plane of the DMD array, the DMD array configured to modulate the light beam and generate an image as reflected image output beams, the 45-45-90 degree prism configured to direct the image output beams to the imaging member; and a DMD housing containing the DMD array, the DMD housing having a width, the illumination module being confined within the width of the DMD housing.

2. The illumination optical system of claim 1, the illumination module being a first illumination module, and further comprising a second illumination module, the second illumination module including a second light source, a second light guide, a second DMD array, a second RTIR prism and a second DMD housing containing the second DMD array, the second RTIR configured to direct second image output beams from the second DMD array to the imaging member, the second DMD housing having a second width with the second illumination module being confined within the width of the second DMD housing, the second illumination module stacked against the first illumination module in a side-by-side configuration for stitching of the image output beams and the second image output beams into an image line parallel to the row direction of the DMD array.

3. The illumination optical system of claim 1, wherein the light guide is a wedge light guide having a longitudinal direction, the wedge light guide configured to transport the light beam out of the light guide in a direction different than the longitudinal direction towards the RTIR prism, the compound angle prism being a wedge prism.

4. The illumination optical system of claim 1, wherein the DMD array micromirrors are tilted plus or minus 12 degrees around a 45 degree tilted diagonal axis.

5. The illumination optical system of claim 1, further comprising a DMD window mounted parallel to and between the bottom face of the 45-45-90 degree prism and the DMD array.

6. The illumination optical system of claim 1, wherein the DMD array is configured to reflect incident light of off state beams different that the image output beams, the 45-45-90 degree prism having a width greater than the width of the compound angle prism to direct the incident light of off state beams away from the image output beams.

7. The illumination optical system of claim 1, wherein both the compound angle prism and the 45-45-90 degree prism have the same refractive index.

8. The illumination optical system of claim 1, wherein the light source is a plurality of laser diode bars, and further comprising a collimator lens between the laser diode bars and the light guide.

9. The illumination optical system of claim 1, wherein the light guide is tilted at an angle towards the compound angle prism based on the refractive index of the RTIR prism and the central ray direction of the redirected light beam incident on the DMD.

10. The illumination optical system of claim 1, further comprising relay lenses between the light guide and the RTIR prism, the relay lenses configured to image the exit face of the light guide onto the DMD array via the RTIR prism.

11. An illumination optical system configured to illuminate a Digital Micromirror Device (DMD) array, comprising:

a plurality of illumination modules stacked against each other in a side-by-side configuration, each illumination module including:
a light source configured to generate a light beam,
a light guide adjacent the light source to transport the light beam from the light source,
the DMD array having an array of micromirrors in 2D configuration tilted around a diagonal axis, the DMD array of micromirrors being planar with a row direction and a column direction orthogonal to the row direction, both the row direction and the column direction being within the plane of the DMD array, the light beam being transported by the light guide and out of an exit face of the light guide at a compound angle relative to the row and column directions, and
a Refractive Total Internal Reflection (RTIR) prism that receives the light beam from the light guide and redirects the light beam to the DMD array along a compound incident angle, the RTIR prism including a 45-45-90 degree prism and a compound angle prism, the compound angle prism having a 45 degree bottom face above a top face of the 45-45-90 degree prism with an airspace gap therebetween, the 45-45-90 degree prism having a bottom face mounted parallel to the plane of the DMD array, the DMD array configured to modulate the light beam and generate an image as reflected image output beams, the 45-45-90 degree prism configured to direct the image output beams to the projection optics that images the DMD array onto the imaging member; and
a DMD housing containing the DMD array, the DMD housing having a width, the illumination module being confined within the width of the DMD housing,
wherein the plurality of illumination modules are stacked against each other in a side-by-side configuration with parallel DMD row directions for stitching of the image output beams of each illumination module into an image line parallel to the row direction of the DMD arrays.

12. The illumination optical system of claim 11, wherein the light guide is a wedge light guide having a longitudinal direction, the wedge light guide configured to transport the light beam out of the light guide in a direction different than the longitudinal direction towards the RTIR prism, the compound angle prism being a wedge prism.

13. The illumination optical system of claim 11, wherein the DMD array micromirrors are tilted plus or minus 12 degrees around a 45 degree tilted diagonal axis.

14. The illumination optical system of claim 11, further comprising a DMD window mounted parallel to and between the bottom face of the 45-45-90 degree prism and the DMD array.

15. The illumination optical system of claim 11, wherein the DMD array is configured to reflect incident light of off state beams different that the image output beams, the 45-45-90 degree prism having a width greater than the width of the compound angle prism to direct the incident light of off state beams away from the image output beams.

16. The illumination optical system of claim 11, wherein the light source is a plurality of laser diode bars, and further comprising a collimator lens between the laser diode bars and the light guide.

17. The illumination optical system of claim 11, wherein the light guide is tilted at an angle towards the compound angle prism based on the refractive index of the RTIR prism and the central ray direction of the redirected light beam incident on the DMD.

18. The illumination optical system of claim 11, further comprising relay lenses between the light guide and the RTIR prism, the relay lenses configured to image the exit face of the light guide onto the DMD array via the RTIR prism.

19. A method of illuminating a Digital Micromirror Device (DMD) array, comprising:
generating a light beam from a light source of a first illumination module, the illumination module including a light guide, a Refractive Total Internal Reflection (RTIR) prism and the DMD array in a DMD housing, the DMD housing having a width, the first illumination module being confined within the width of the DMD housing;
transporting the light beam from the light source to a RTIR prism with a light guide, the light beam being transported by the light guide and out of an exit face of the light guide at a compound angle relative to a DMD array;
redirecting the light beam to the DMD array along a compound incident angle with the RTIR prism, the RTIR prism including a 45-45-90 degree prism and a compound angle prism, the compound angle prism having a 45 degree bottom face above a top face of the 45-45-90 degree prism with an airspace gap therebetween, the 45-45-90 degree prism having a bottom face mounted parallel to the plane of the DMD array,
modulating the light beam with the DMD array to generate an image as reflected image output beams, the DMD array being an array of micromirrors in 2D configuration tilted around a diagonal axis, the DMD array of micromirrors being planar with a row direction and a column direction orthogonal to the row direction, both the row direction and the column direction being within the plane of the DMD array,
redirecting the reflected image output beams to the projection optics that images the DMD array onto the imaging member through the 45-45-90 degree prism;
stitching the image output beams to image output beams from a second illumination module stacked against the first illumination module in a side-by-side configuration with parallel DMD row directions, the stitched image out beams forming an image line parallel to the row direction of the DMD arrays.

20. The method of claim 13, further comprising tilting the light guide at an angle towards the compound angle prism based on the refractive index of the RTIR prism and the central ray direction of the redirected light beam incident on the DMD.

* * * * *